US012345546B2

United States Patent
Dormody et al.

(10) Patent No.: US 12,345,546 B2
(45) Date of Patent: Jul. 1, 2025

(54) DEVICE BASED BAROMETRIC PRESSURE SENSOR CALIBRATION

(71) Applicant: NextNav, LLC, Sunnyvale, CA (US)

(72) Inventors: Michael Dormody, San Jose, CA (US); Arun Raghupathy, Bangalore (IN); Badrinath Nagarajan, Cupertino, CA (US); Frank Yenshaw, San Mateo, CA (US); Deepak Joseph, Oakton, VA (US)

(73) Assignee: NextNav, LLC, Sunnyvale, CA (US)

( * ) Notice: Subject to any disclaimer, the term of this patent is extended or adjusted under 35 U.S.C. 154(b) by 251 days.

(21) Appl. No.: 17/823,135

(22) Filed: Aug. 30, 2022

(65) Prior Publication Data

US 2023/0273049 A1 Aug. 31, 2023

Related U.S. Application Data

(60) Provisional application No. 63/261,139, filed on Sep. 13, 2021.

(51) Int. Cl.
*G01C 25/00* (2006.01)
*G01C 5/06* (2006.01)

(52) U.S. Cl.
CPC .............. *G01C 25/00* (2013.01); *G01C 5/06* (2013.01)

(58) Field of Classification Search
None
See application file for complete search history.

(56) References Cited

U.S. PATENT DOCUMENTS

| 10,694,325 | B2 * | 6/2020 | Robertson | G01C 21/005 |
| 11,747,232 | B2 * | 9/2023 | Mahurkar | G01L 19/0092 |
| | | | | 73/1.57 |
| 11,841,285 | B2 * | 12/2023 | Dormody | G01C 25/00 |
| 2014/0102169 | A1 | 4/2014 | Yoneyama | |
| 2017/0075037 | A1 | 3/2017 | Springer et al. | |
| 2018/0094998 | A1 * | 4/2018 | Youssef | G01L 13/06 |
| 2018/0295598 | A1 * | 10/2018 | Donnellan | G01S 5/012 |
| 2020/0260406 | A1 * | 8/2020 | Pattabiraman | H04B 7/061 |

OTHER PUBLICATIONS

International Search Report and Written Opinion dated Jan. 5, 2023 for PCT Patent Application No. PCT/IB2022/058115.
Office Action dated Jan. 9, 2025 for European Patent Office Patent Application No. 22772590.0.

* cited by examiner

*Primary Examiner* — Kristina M Deherrera
*Assistant Examiner* — Mark A Shabman
(74) *Attorney, Agent, or Firm* — MLO, a professional corp.

(57) ABSTRACT

Device-based barometric pressure sensor calibration involves determining a specific location of the mobile device; determining a general location of the mobile device that encompasses and obfuscates the specific location; transmitting the general location to a server; receiving general calibration data for the general location; determining specific calibration data based on the general calibration data and the specific location; determining a calibration value based on the specific calibration data, the calibration value being for calibrating the barometric pressure sensor.

20 Claims, 7 Drawing Sheets

DEVICE BASED BAROMETRIC PRESSURE SENSOR CALIBRATION

RELATED APPLICATIONS

This application claims priority to U.S. Provisional Patent Application No. 63/261,139, filed on Sep. 13, 2021, and entitled, "Device Based Barometric Pressure Sensor Calibration", all of which is hereby incorporated by reference in its entirety and for all purposes.

BACKGROUND

Some mobile devices are part of systems that determine an altitude of the mobile devices based on barometric pressure. In a barometric-based location determination system, the altitude of the mobile device is calculated using a calibrated barometric pressure sensor and by correcting for the weather effects using ambient pressure and temperature measurements obtained from a calibrated network of sensors deployed at known locations near the mobile device. Such systems necessarily rely on a well-calibrated barometric pressure sensor within the mobile device. Unfortunately, most consumer-grade barometric pressure sensors are inexpensive sensors that may not be well-calibrated. Furthermore, even if the barometric pressure sensor is accurately calibrated at one time, the calibration may drift over time, thereby eventually becoming poorly calibrated and rendering the altitude determination capabilities of the mobile device inaccurate, unreliable, or useless. Therefore, it is necessary for the mobile device to communicate with a system with which to calibrate its barometric pressure sensor.

Conventional calibration techniques typically involve a server that performs the calibration calculations upon receiving location and pressure information from the mobile device. The server also uses additional information from various databases to perform the calibration calculations. These databases are very large and can be stored in a centralized location. Some of these databases typically include generally static information such as altitude levels for various regions of terrain and height and floor data for buildings or structures. Other databases include dynamic data that changes often, such as pressure, temperature, and humidity measurements from a network of reference weather stations with known locations and altitudes.

It is also possible for conventional calibration techniques to be performed by the mobile device by transmitting the additional information from the server to the mobile device after the mobile device provides its location to the server, and the location can be used to query/derive such additional information necessary for calibration. Such a "device-based" calibration technique can relieve the server of some of the computing load and thus reduce server costs.

Privacy concerns, however, can make both the server-based and device-based conventional techniques undesirable. This is because the mobile device must provide its precise location to the server, regardless of whether the server or the mobile device does the calibration calculations. Additionally, the device-based conventional techniques are typically less desirable, because they generally have higher power consumption, greater storage consumption, and greater network bandwidth.

SUMMARY

In some embodiments, systems and methods for device-based barometric pressure sensor calibration that do not require providing the mobile device's precise location to a server involve the mobile device determining a specific location of the mobile device; determining a general location of the mobile device that encompasses and obfuscates the specific location; transmitting the general location to a server; receiving general calibration data for the general location; determining specific calibration data based on the general calibration data and the specific location; determining a device pressure based on a pressure measurement by a barometric pressure sensor of the mobile device; determining a calibration value based on the specific calibration data and the device pressure, the calibration value being for calibrating the barometric pressure sensor; and calculating an altitude of the mobile device using the calibration value and a subsequent pressure measurement by the barometric pressure sensor.

In some embodiments, the general location comprises a bounding area, the specific location is at any point within the bounding area, and the general calibration data includes a portion of terrain and building data with respect to the bounding area and reference pressure and temperature data for a region that encompasses the bounding area. In some embodiments, the general location comprises a plurality of locations which includes the specific location and a remainder of locations; the plurality of locations is within a region; the specific location is at any point within the region; and the general calibration data includes a possible altitude for each location of the plurality of locations and a reference pressure and a reference temperature for each location of the plurality of locations.

In some embodiments, the mobile device determines a specific location and a timestamp of the mobile device; determines a device pressure at the specific location and the timestamp based on a pressure measurement by a barometric pressure sensor of the mobile device; determines a plurality of locations which includes the specific location and dummy locations; determines dummy device pressures and dummy timestamps for the dummy locations; transmits to a server the specific location, the dummy locations, the timestamp, the dummy timestamps, the device pressure, and the dummy device pressures; receives from the server general calibration data for the plurality of locations; selects specific calibration data for the specific location from the general calibration data; determines a calibration value based on the specific calibration data, the calibration value being for calibrating the barometric pressure sensor; and calculates an altitude of the mobile device using the calibration value and a subsequent pressure measurement by the barometric pressure sensor.

DETAILED DESCRIPTION

Figure 1:
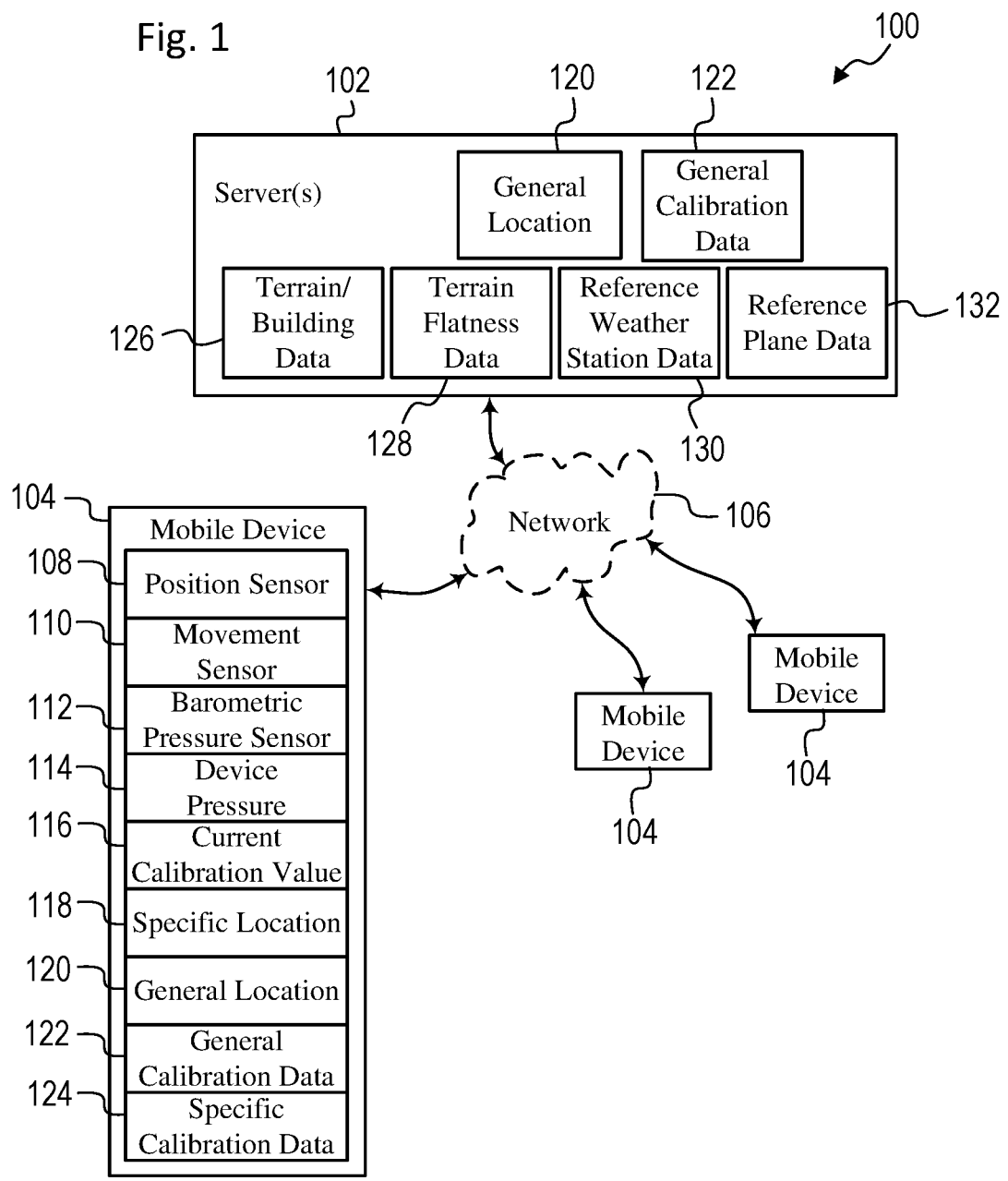
FIG. 1 is a simplified schematic diagram of an example system for calibrating a barometric pressure sensor of a mobile device, in accordance with some embodiments.

A calibration system or method described herein enables barometric pressure sensor calibration by a mobile device (i.e., "device-based" calibration) by providing an ambiguous, general location of the mobile device, rather than a precise, specific location thereof, from the mobile device to a server. Then, based on the general location, the server sends general calibration data, rather than location-specific calibration data, to the mobile device. The general calibration data includes different information in different embodiments, but generally includes more data than is necessary for the mobile device to perform its calibration calculation, because the general calibration data is provided for a relatively wide (but not too wide) geographical area, rather than for the precise, specific location of the mobile device. From the general calibration data, therefore, the mobile device determines the necessary location-specific calibration data (i.e., "reference data" or "assistance data"), such as a reference pressure, a reference temperature, a reference altitude, and a possible altitude for the mobile device. With the location-specific calibration data and a pressure measurement by the barometric pressure sensor therein, the mobile device determines a calibration value for calibrating the barometric pressure sensor. Additional details are described below.

Since the mobile device performs the calibration calculation, the server is relieved of some of the computing load. Thus, server costs may be reduced by distributing the computing load across both the server and the mobile device. There is a tradeoff, however, because transmission bandwidth may be affected since the server sends more data than is necessary for the mobile device to perform the calibration calculation. On the other hand, since the mobile device sends the ambiguous, general location of the mobile device to the server, the precise, specific location thereof is obfuscated. Thus, the specific location of the mobile device is not revealed to the server, and a level of privacy is maintained for the user of the mobile device, albeit at the potential expense of increasing the data transmission load from the server to the mobile device and increasing the computing load of the mobile device to determine the necessary location-specific calibration data.

To calibrate the mobile device's barometric pressure sensor, the pressure measurement is adjusted such that it reads an accurate pressure when compared to a calibrated pressure device. This is generally achieved by adjusting the pressure so that the altitude calculated from the pressure measurement matches with the expected or known altitude at the location of the mobile device. The quality of the expected altitude in this calculation depends on a high-quality measurement of the location of the mobile device, since the lookup of expected altitude is very sensitive to precise location due to various considerations, such as the fact that building density and terrain changes can be significant over 10s of meters in horizontal displacement. Under a conventional obfuscation technique, it is possible to protect user privacy by coarsening the horizontal location of the mobile device (e.g., increasing the 2D position out to 1-10 km), thereby rendering the location of the mobile device less certain. However, even the slightest coarsening of the horizontal location (e.g., greater than 10s of meters) of the mobile device would be insufficient to get reliable calibration information from the assistance database, such as for the expected altitude. Therefore, the resulting calibration or altitude determination would be highly unreliable in this situation. On the other hand, if the assistance data lookup is performed on the mobile device from a locally downloaded file, it is unreasonable to send the entire assistance database to the mobile device owing to storage issues, data bandwidth issues, and power consumption concerns. In addition, in situations where there is limited network connectivity, it becomes challenging to perform a calibration calculation as the necessary assistance data may not yet be available or downloaded. Therefore, the present disclosure solves these issues by sending the general location of the mobile device to the server and receiving back the general calibration data, which is small enough to be efficiently transmitted to the mobile device and provides all of the information needed for the mobile device to perform the calibration calculation.

FIG. 1 is a simplified schematic diagram of an example device-based calibration system 100 for calibrating a barometric pressure sensor in a user's mobile device, in accordance with some embodiments. In some embodiments, the calibration system 100 generally includes a server 102 and several user devices or mobile devices 104. The server 102 and the mobile devices 104 generally communicate through a network 106.

The server 102 generally represents one or more computerized devices, such as a cloud computing system, a server farm, a set of computers, a desktop computer, a notebook computer, among others. The mobile devices 104 each generally represent a mobile phone, smart phone, a cell phone, other wireless communication device, a handheld computer, a notebook computer, a personal computer, a portable computer, a navigation device, a tracking device, a receiver, a wearable computing device, etc. The network 106 generally represents any appropriate combination of one or more communication systems, such as the Internet, cell phone communication systems, broadband cellular networks, wide area networks (WANs), local area networks (LANs), wireless networks, networks based on the IEEE 802.11 family of standards (Wi-Fi networks), and other data communication networks.

In some embodiments, each mobile device 104 generally includes a position sensor 108, a movement sensor 110, a barometric pressure sensor 112, a device pressure 114, a current calibration value 116 (having a calibration amount, a calibration confidence interval, and a timestamp of when the calibration was performed), a specific location 118, a general location 120, general calibration data 122, and specific calibration data 124, among other hardware, software and data. The position sensor 108 generally represents one or more appropriate sensor devices and associated software for detecting a position of the mobile device 104, such as for a Global Navigation Satellite System (GNSS, such as GPS, GLONASS, Galileo, Compass/Beidou), a terrestrial transmitter system, or a hybrid satellite/terrestrial system, among others. Position data from the position sensor 108 is generally used by the mobile device 104 to determine the specific location 118, which represents the mobile device's estimate of its horizontal position, e.g., latitude and longitude, at a given time (represented by a related timestamp). Additionally, the specific location 118 may include a specific location area surrounding a specific location point due to a confidence interval value associated with the position data from the position sensor 108. Thus, the true location of the mobile device 104 is expected to be within the specific location area with the specific location point being the most likely point for the true location.

The movement sensor 110 generally represents one or more appropriate sensor devices and associated software for detecting movement of the mobile device 104, such as an accelerometer, a gyroscope, a magnetometer/compass, and/or a pedometer, among others. Movement data from the movement sensor 110 can be used by the mobile device 104 to determine an activity of the mobile device 104. Additionally, the specific location 118 and the activity can be used to determine when a good opportunity has occurred for calibrating the mobile device 104.

The barometric pressure sensor 112 represents any appropriate sensor device that generates an atmospheric pressure measurement (i.e., the device pressure 114) with which the mobile device 104 determines its altitude. The current calibration value 116 is used by the mobile device 104 or the barometric pressure sensor 112 to calibrate the barometric pressure sensor 112, i.e., to adjust the raw pressure measurement to obtain a more accurate adjusted pressure measurement with which to determine the altitude.

In some embodiments, the mobile device 104 generates the general location 120 from the specific location 118 (with related timestamp) and transmits the general location 120 in a request to the server 102. The general location 120 is selected to obfuscate the mobile device's estimate of its actual position in different ways depending on the embodiment. For example, in some embodiments, the general location 120 provides a bounding area that encompasses the specific location 118, and if the specific location 118 includes the specific location area, then the bounding area is larger than the specific location area. Additionally, the general location 120 is selected such that the specific location 118 can be anywhere within the bounding area, thereby rendering it nearly impossible to determine the mobile device's estimated position from the bounding area. In other embodiments, the general location 120 includes multiple locations, the specific location 118 is one of the multiple locations, the remainder of the locations are dummy locations randomly selected to be in the same general region as the specific location 118, and the specific location 118 is at any point or area within that general region. Due to the random selection of the remainder of the locations, it is nearly impossible to determine which of the multiple locations is the specific location 118.

In some embodiments, the server 102 generally contains the general location 120 (received from the mobile device 104), terrain and building data 126, terrain quality data 128, reference network weather station data 130, reference network weather station data sample ("reference data sample") 132, and the general calibration data 122, among other hardware, software and data. The terrain quality data 128 generally includes terrain flatness data (which indicates how bumpy or smooth a terrain is for a predetermined location and region) and terrain accuracy data (which indicates how accurate the underlying terrain database is relative to the actual terrain). The server 102 receives the general location 120 for each mobile device 104. In response to receiving the general location 120, the server 102 assembles the general calibration data 122 from the "assistance database" data 126-132 based on the general location 120 and sends the general calibration data 122 back to the mobile device 104. The assistance databases generally include two databases: the user altitude database (for the data of the terrain and building data 126 and the terrain quality data 128) and the reference weather database (for the relatively dynamic data of the reference network weather station data 130 and the reference network weather station data sample 132). The general calibration data 122, thus, represents a portion of the assistance databases for a region that is large enough to encompass the general location 120 (and, thus, the mobile device's true location) and small enough to be efficiently transferred from the server 102 to the mobile device 104, to be queried reasonably quickly, and not to be a drain on battery or CPU resources of the mobile device 104.

In some embodiments, the server 102 can divide or segment the assistance database to send it to the mobile device 104 in small batches, when a server-to-device connection is available. Then the mobile device 104 can assemble the assistance database later when calibration is needed (e.g., after the data necessary for calibration has been collected). This is beneficial if there is limited connectivity or limited bandwidth between the mobile device 104 and the server 102.

In some embodiments, the server 102 maintains the terrain and building data 126 in a terrain and building database. The terrain portion of this data generally indicates altitude levels across the terrain for a wide region, e.g., as a geographical grid of altitudes, a topographic map, or other appropriate technique. The building portion of this data generally indicates where buildings and other structures are within the same region, as well as height, number of floors and/or other information related to the buildings or structures. The terrain quality data 128 generally indicates a degree of flatness or variation of the terrain within the region or subdivided portions thereof, e.g., a plus/minus altitude difference with respect to the average altitude within the subdivision. Additionally, the terrain quality data 128 may be included in, or derived from, the terrain and building data 126.

In some embodiments, the process that uses the terrain-related data 126 and 128 can be optimized by precomputing relevant statistics (e.g., a terrain and building distribution for a given latitude, longitude and confidence) and store that in a single database to be sent to the mobile device 104 as a modified form of the terrain-related data 126 and 128 with respect to the bounding area or the multiple locations upon receiving the general location 120. This has the advantage of being smaller in size than the full terrain-related data 126 and 128 and requiring less calibration calculation by the mobile device 104. In some embodiments, the terrain-related data 126 and 128 can be further optimized by returning a polynomial model fit to the data, which is even smaller in size than the precomputed relevant statistics.

Upon receiving the general location 120 from the mobile device 104, the server 102 assembles a portion of the terrain-related data 126 and 128 that is relevant to the general location 120, i.e., with respect to the bounding area or the multiple locations. In some embodiments in which the general location 120 is a bounding area, the server 102 can assemble the relevant portion of the terrain-related data 126 and 128 for a region that matches or fully encompasses the boundaries of the bounding area upon receiving the general location 120. Alternatively, since the terrain-related data 126 and 128 does not change very often, the server 102 can subdivide the terrain-related data 126 and 128 into multiple regions beforehand and simply maintain the terrain-related data 126 and 128 for each predetermined region until needed. When the server 102 receives the bounding area from the mobile device 104, the server 102 can determine whether the bounding area is fully encompassed by just one of the predetermined regions or more than one. Then the server 102 can assemble the portion of the terrain-related data 126 and 128 by selecting the terrain-related data 126 and 128 for the one or more predetermined regions that overlap with and fully encompass the bounding area; thereby providing at least all of the terrain-related data 126 and 128 related to the bounding area and potentially speeding up the response by the server 102. (The portion of the terrain-related data 126 and 128 will, thus, cover a region that also encompasses the specific location 118.) In some embodiments in which the general location 120 is multiple locations, the server 102 can assemble the relevant portion of the terrain-related data 126 and 128 for each individual location of the multiple locations. (In this case, the portion of the terrain-related data 126 and 128 can be simplified to include just a possible altitude and altitude confidence or uncertainty specifically for each of the individual locations, which will necessarily include the possible altitude and altitude confidence or uncertainty for the specific location 118.) Alternatively, the server 102 can maintain the terrain-related data 126 and 128 for the multiple predetermined regions beforehand and then assemble the terrain-related data 126 and 128 by selecting the terrain-related data 126 and 128 for one or more such predetermined regions that encompass the multiple locations of the general location 120. (The selected terrain-related data 126 and 128 will, thus, cover a region that also encompasses the specific location 118.) The portion of the terrain-related data 126 and 128 that is relevant to the general location 120 is included as part of the general calibration data 122 that the server 102 sends to the mobile device 104.

In some embodiments, the terrain-related data 126 and 128 can be a database (i.e., the user altitude database) with which to establish the likely altitude distribution of mobile device 104 for a given specific location 118 (2D position) and confidence, along with some physical assumptions (e.g., the user and mobile device 104 cannot be not floating in mid-air). The database for the terrain-related data 126 and 128 is considered "static", because it is a database that does not need frequent updates, which has the added benefit that it would need to be retrieved by the mobile device 104 only once for a region of interest (e.g., one or more regions encompassing the bounding area or the multiple locations), but may occasionally be refreshed by the mobile device 104 if the underlying database at the server 102 were updated since retrieval, for example with a map update due to erosion, accretion, building construction, etc. In some embodiments, the mobile device 104 can query the user altitude database that it now contains with query inputs and response outputs that might look like the following:

$$F_{user_{alt}}(\text{latitude}, \text{longitude}, \text{conf2D}) = (\text{likely altitude}, \text{altitude confidence}, \text{terrain flatness}),\quad \text{Equation 1}$$

where the query $F_{user_{alt}}$ provides the latitude, longitude and 2D location confidence interval (conf2D) for the specific location 118; and the response provides the likely or possible altitude for the specific location 118 along with the altitude confidence and the flatness of the terrain in the area covering the location confidence interval. Additionally, such a database can take the form of a lookup table, a Deep Learning model, etc.

In some embodiments, the server 102 maintains the reference network weather station data 130 in a reference pressure/temperature database (or weather measurements database) that is comparatively dynamic (i.e., that is updated periodically). This database can take any appropriate form, such as a lookup table. This database can also comprise an interpolated polynomial surface that describes reference pressure P or reference temperature T at a given location at a given time. For example, if the coordinates are X and Y, then a time-dependent, $2^{nd}$ order, two-dimensional polynomial surface would have 6 parameters per time slice, as described in this piecewise functional notation:

$$F_{userPTref}(X, Y, t) = \begin{cases} A_0 + B_0(X - X') + C_0(Y - Y') + D_0(X - X')(Y - Y') + \\ \quad E_0(X - X')^2 + F_0(Y - Y')^2, t = t_0 \\ A_1 + B_1(X - X') + C_1(Y - Y') + D_1(X - X')(Y - Y') + \\ \quad E_1(X - X')^2 + F_1(Y - Y')^2, t = t_1 \\ \quad \ldots \\ A_N + B_N(X - X') + C_N(Y - Y') + D_N(X - X')(Y - Y') + \\ \quad E_N(X - X')^2 + F_N(Y - Y')^2, t = t_N \end{cases}, \quad \text{Equation 2}$$

where A-F are fit parameters, X' and Y' are the center of the region of interest (but could be any location), and t is the time corresponding to the A-F fit parameters. Other models can include 3D polynomials (using X, Y, and t), or other non-polynomial functions such as exponential, logistic, etc.

The reference network weather station data 130 is received from a network of calibrated weather stations that periodically provide pressure, temperature, and humidity data, among other possible weather-related data. The server 102 generates the reference network weather station data sample 132 from the reference network weather station data 130 for appropriate regions across a wider geographical area. The reference network weather station data sample 132 for any given region or location may be pressures and temperatures for a reference plane within the region, a geographical grid of pressures and temperatures for the region, a topographic-like map of pressure and temperature for the region, the pressure, temperature and location data from one or more of the weather stations nearest the region or location, an averaged pressure and temperature from multiple weather stations within the vicinity of the region or location, an interpolated pressure and temperature based on a polynomial model of the pressure and temperature fitted to the measurements from the reference network of weather stations within the vicinity of the region or location, or a reference pressure and temperature for a region or location based on other methods. Embodiments that use the model of the pressure and temperature may have an advantage of being smaller in size and requiring minimal calibration calculation by the mobile device 104 compared to other techniques.

Upon receiving the general location 120 from the mobile device 104, the server 102 assembles the relevant data from the reference network weather station data 130 to form the reference network weather station data sample 132 (i.e., reference pressure data and reference temperature data and confidences therefor) for the general location 120 (or a region that encompasses the general location 120 and, thus, the bounding area or the multiple locations) and the time indicated by the timestamp. In some embodiments in which the general location 120 is a bounding area, the reference network weather station data sample 132 is assembled on-the-fly specifically for the bounding area from the reference network weather station data 130 in the same general region as the bounding area. Alternatively, although the reference network weather station data 130 (and, thus, the reference network weather station data sample 132) may change periodically as weather conditions change, the server 102 can nevertheless subdivide the reference network weather station data 130 and/or the reference network weather station data sample 132 into multiple predetermined regions beforehand and simply maintain the reference network weather station data 130 and/or the reference network weather station data sample 132 for each region until needed, albeit with periodic updates. When the server 102 receives the bounding area from the mobile device 104, the server 102 can determine whether the bounding area is fully encompassed by just one of the predetermined regions or more than one. Then the server 102 can assemble the reference network weather station data sample 132 by selecting the reference network weather station data sample 132 for the one or more such predetermined regions that overlap with and fully encompass the bounding area; thereby potentially speeding up the response by the server 102. (The reference network weather station data sample 132 will, thus, cover a region that also encompasses the specific location 118.) In some embodiments in which the general location 120 includes multiple locations, the server 102 can form the reference network weather station data sample 132 for each individual location of the multiple locations. (In this case, the reference network weather station data sample 132 is simplified to include just a reference pressure and a reference temperature specifically for each of the individual locations, which will necessarily include the reference pressure and reference temperature for the specific location 118.) Alternatively, the server 102 can maintain the reference network weather station data sample 132 for the multiple predetermined regions beforehand and then assemble the reference network weather station data sample 132 by selecting the reference network weather station data sample 132 for one or more such predetermined regions that encompass the multiple locations of the general location 120. (The selected reference network weather station data sample 132 will, thus, cover a region that also encompasses the specific location 118.) The reference network weather station data sample 132 for the general location 120 and timestamp is included as part of the general calibration data 122 that the server 102 sends to the mobile device 104.

Upon receiving the general calibration data 122 from the server 102, the mobile device 104 determines the specific calibration data 124 based on the general calibration data 122 and the specific location 118. The specific calibration data 124 includes the parameters or values needed for performing the calibration calculations, e.g., a reference pressure, a reference temperature, and a possible altitude of the mobile device 104, as well as confidence interval values for these values. These values are also known as "reference data" or "assistance data". Thus, the mobile device 104 determines specific terrain and building data for the specific location from the portion of the terrain and building data 126; determines a possible altitude for the mobile device 104 based on the specific terrain and building data; and determines a specific reference pressure and a specific reference temperature for the specific location 118 from the reference pressure data and the reference temperature data for the region that encompasses the bounding area or for the multiple locations.

The mobile device 104 determines the possible altitude and altitude confidence or uncertainty of the mobile device 104 from the received portion of the terrain-related data 126 and 128 in light of the specific location 118. In some embodiments in which the relevant portion of the terrain-related data 126 and 128 covers a region that encompasses the specific location 118, the mobile device 104 calculates the possible altitude and altitude confidence or uncertainty for the specific location 118 from the portion of the terrain-related data 126 and 128 based on the specific location 118. In some embodiments in which the portion of the terrain-related data 126 and 128 has been simplified to include just the possible altitude and altitude confidence or uncertainty specifically for each of the individual locations of the multiple locations, the mobile device 104 determines the possible altitude and altitude confidence or uncertainty for the specific location 118 by simply selecting it from among the data for all of the multiple locations and deleting the remainder. The possible altitude and altitude confidence or uncertainty for the specific location 118 is thus part of the specific calibration data 124.

Additionally, in some embodiments, the mobile device 104 caches or stores the received portion of the terrain-related data 126 and 128 in association with a geofence. Thus, the mobile device 104 does not delete the received portion of the terrain-related data 126 and 128 until it detects that it is no longer in the region covered by the received portion of the terrain-related data 126 and 128. In this manner, the mobile device 104 can perform a new calibration calculation using newly collected pressure and location data with the same received portion of the terrain-related data 126 and 128 as long as the mobile device 104 is still in the same region, so the mobile device 104 does not have to send a new request to the server 102 in this situation.

The mobile device 104 determines the reference pressure and reference temperature and the confidence or uncertainty thereof from the received reference network weather station data sample 132 in light of the specific location 118. In some embodiments in which the received reference network weather station data sample 132 is for a region that encompasses the specific location 118, the mobile device 104 calculates the reference pressure and reference temperature and the confidence or uncertainty thereof from the received reference network weather station data sample 132 based on the specific location 118. In some embodiments in which the reference network weather station data sample 132 has been simplified to include just a reference pressure and a reference temperature specifically for each of the individual locations of the multiple locations, the mobile device 104 determines the reference pressure and reference temperature and the confidence or uncertainty thereof for the specific location 118 by simply selecting it from among the data for all of the multiple locations and deleting the remainder. The reference pressure and reference temperature and the confidence or uncertainty thereof for the specific location 118 is thus part of the specific calibration data 124.

In addition to the data determined from the data obtained from the server 102, the specific calibration data 124 also includes a pressure measurement (i.e., device pressure) from the barometric pressure sensor 112 of the mobile device 104 and a confidence or uncertainty for this measurement. Thus, the mobile device 104 assembles the necessary values (e.g., the possible altitude of the mobile device 104, the reference pressure, the reference temperature, and the device pressure for the specific location 118) for calculating the calibration amount for the calibration value. Additionally, the mobile device 104 assembles the necessary values (e.g., the terrain flatness from the terrain quality data 128 and the confidence or uncertainty values for the possible altitude, the reference pressure, the reference temperature, and the device pressure) for calculating the calibration confidence interval for the calibration value.

The mobile device 104 stores this calibration value along with other calibration values determined previously or subsequently in a "calibration table". Calibration values that are considered to be too old or unreliable can be deleted from the calibration table, unless there is only one such calibration value available. The mobile device 104 then selects from among the calibration values in the calibration table one that is considered to be the "best". The best calibration value is stored in a "current calibration table" and used to adjust the raw pressure measurement values generated by the barometric pressure sensor 112 to obtain calibrated pressure measurements. The calibrated pressure measurements are used in determining the altitude of the mobile device 104.

Figure 2:
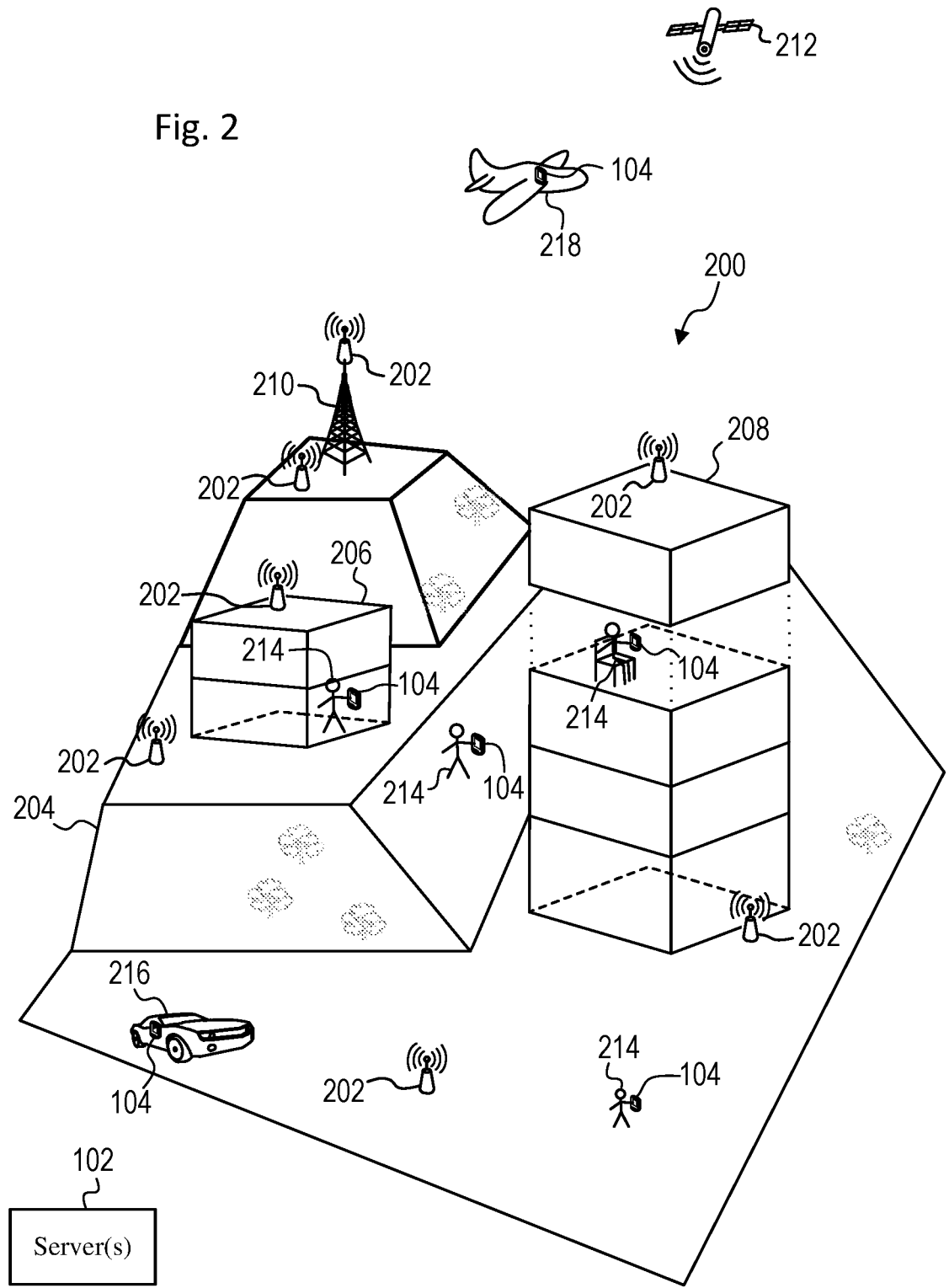
FIG. 2 is a simplified environment in which a mobile device can be used and a barometric pressure sensor in the mobile device can be calibrated, in accordance with some embodiments.

FIG. 2 shows a simplified example environment 200 in which the mobile device 104 can be used, the altitude thereof can be estimated, and the barometric pressure sensor 112 therein can be calibrated, in accordance with some embodiments. The environment 200 includes an example of the network of weather stations 202, examples of the mobile devices 104, and the server(s) 102. The server 102 exchanges communications with various devices, such as the mobile device 104. Also, the example environment 200 includes a terrain 204 having ground levels at different elevations (altitudes) and structures, such as buildings 206 and 208 having floor levels at different altitudes and a transmission tower 210.

The weather stations 202 form a network of terrestrial transmitters that may be located at different altitudes or depths that are inside or outside various natural or manmade structures (e.g., the buildings 206 and 208 and the transmission tower 210), relative to different altitudes throughout the terrain 204, as illustrated by the examples in FIG. 2. In some embodiments, sensor measurements and positioning signals are transmitted from the weather stations 202 and subsequently received by the mobile device 104 and/or the server 102 using known transmission technologies. Positioning signals may also be transmitted from transmitters (that are not weather stations, e.g., the transmission tower 210) located throughout the example environment 200 or from satellites 212 high above the example environment 200. For example, the sensor measurements and positioning signals may be transmitted using one or more common multiplexing parameters that utilize time slots, pseudorandom sequences, frequency offsets, or other approaches, as is known in the art or otherwise disclosed herein.

The mobile devices 104 may be carried by users 214 located at different altitudes or depths that are inside or outside various natural or manmade structures (e.g., the buildings 206 and 208), relative to different altitudes throughout the terrain 204, as illustrated by the examples in FIG. 2. The mobile devices 104 may also be carried or mounted in a vehicle 216 within the environment 200 or an aircraft 218 high above the environment 200.

Figure 9:
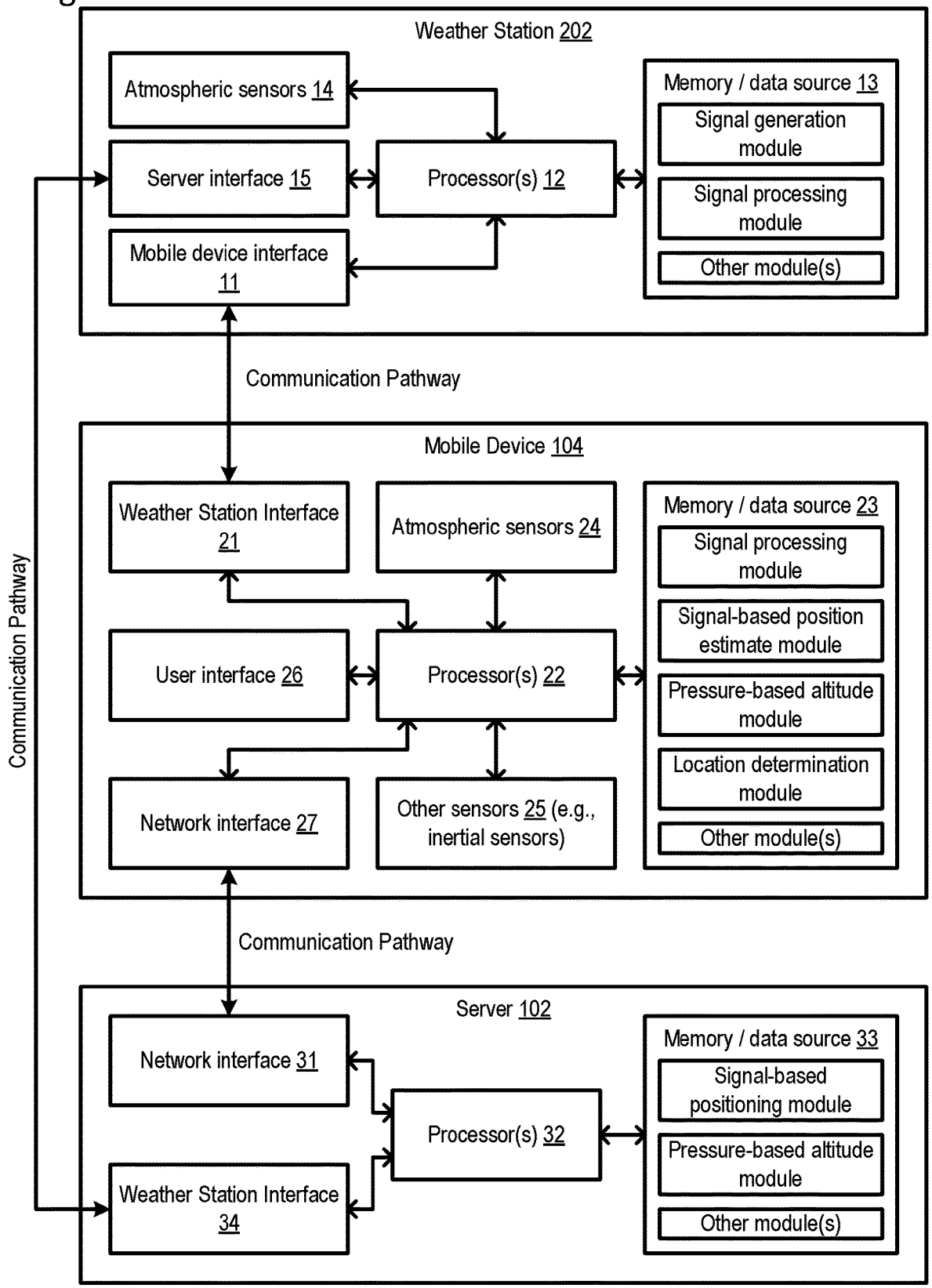
FIG. 9 shows simplified schematic diagrams of a transmitter, a mobile device, and a server, in accordance with some embodiments.

Examples of possible hardware, software and data components in the weather stations 202, the mobile device 104, and the server 102 are shown in FIGS. 1 and 9, as described herein. In particular, each weather station 202 and mobile device 104 may include appropriate atmospheric sensors (e.g., barometric pressure sensors and temperature sensors) for generating measurements of atmospheric conditions (e.g., atmospheric pressure and temperature) that are used to estimate the altitude of the mobile device 104, to estimate the uncertainty in the altitude estimation, or to calibrate the barometric pressure sensor 112 therein.

As the person/user 214 moves with the mobile device 104 through such an environment 200, various opportunities to calibrate the mobile device's barometric pressure sensor 112 may occur. For example, the mobile device 104 may encounter a terrain for which the terrain and building data 126 provides known accurate altitude information and the terrain quality data 128 indicates a small variation in the altitude in the vicinity of the specific location 118 of the mobile device 104. Alternatively, the specific location 118 of the mobile device 104 may indicate that the mobile device 104 has come close to (i.e., within an acceptable threshold distance) of a known accurate sensor device or a known geographic point (such as a monument or a survey marker) for which the altitude is well known. Other types of calibration opportunities may also occur.

Figure 3:
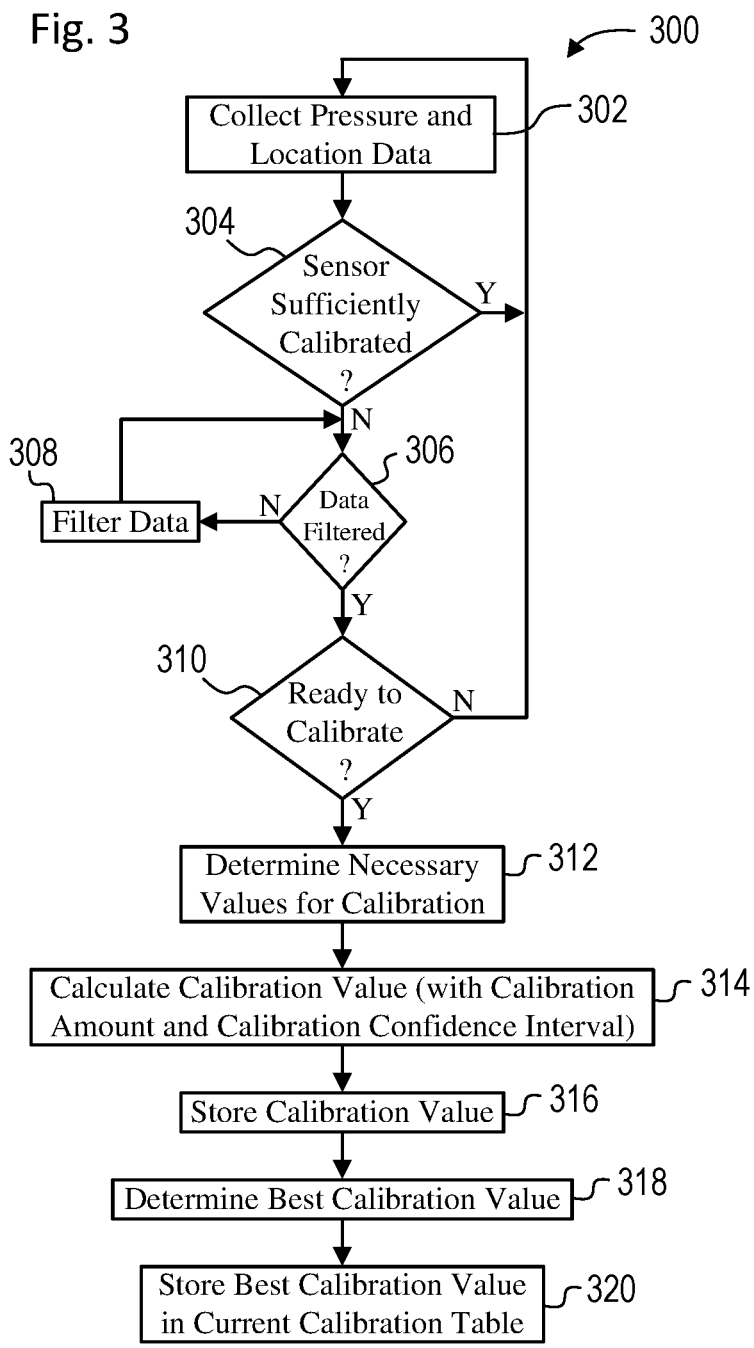
FIG. 3 is a simplified flowchart for an example process for a mobile device to calibrate a barometric pressure sensor in the mobile device, in accordance with some embodiments.

FIG. 3 shows a simplified flowchart for an example process 300 for the mobile device 104 to take advantage of any calibration opportunity and to calibrate its barometric pressure sensor 112, in accordance with some embodiments. The particular steps, combination of steps, and order of the steps for this process are provided for illustrative purposes only. Other processes with different steps, combinations of steps, or orders of steps can also be used to achieve the same or similar result. Features or functions described for one of the steps performed by one of the components may be enabled in a different step or component in some embodiments. Additionally, some steps may be performed before, after or overlapping other steps, in spite of the illustrated order of the steps.

At 302, the mobile device 104 collects pressure data, location data, and related timestamp data (for when the mobile device 104 was at this location and collected this pressure data). The mobile device 104 generally does this on a continual basis based on a set of rules for data collection. The data can be collected either actively or passively (i.e., in the background). The rules for data collection generally define the preferred circumstances under which relevant data is collected. Such rules are generally used to optimize data bandwidth and to ensure that the collected data is of the highest quality and can be used for calibration. The data collection rules can include collecting data under the following conditions, but are not limited to:
  1) The user 214 is being still or walking (not driving) with the mobile device 104. This activity status can be determined from an activity context measurement, or derived using sensor stability measurements from one or more of the position sensor 108, the movement sensor 110, and/or the barometric pressure sensor 112;
  2) The mobile device 104 is outside, away from a building, as may be determined from building footprint data within the terrain and building data 126, if available;
  3) The mobile device 104 is on a flat grade, as may be determined from the terrain-related data 126 and 128, if available;
  4) The mobile device 104 is inside a building on a known floor, as may be determined from building floor data within the terrain and building data 126, if available; and 5) The user 214 with the mobile device walks by, passes by, or stops at a known calibrated pressure instrument or calibrated device.

When any one or more of these rules is satisfied, then it is preferred to collect the pressure and location data, since the data is considered to be more useful or reliable under these conditions. Additionally, the data collection can be more aggressive or less aggressive (i.e., dependent on different thresholds for each of the rules #1-#5) depending on whether the mobile device 104 already has a calibration value that was recently determined and is considered to be reliable.

At 304, the mobile device 104 determines whether its barometric pressure sensor 112 is already sufficiently calibrated. To do so, the mobile device 104 queries its calibration table to determine whether it contains a sufficiently accurate and reliable calibration value. This determination can examine the data in the calibration table in one or more different ways, such as:

1. Determining whether there is calibration value with a calibration confidence interval that is less than or equal to a confidence threshold of N Pa (e.g., N=10 Pa), wherein the confidence threshold can be established through drift modelling of sensors comparable to the barometric pressure sensor 112;
2. Determining whether there is a calibration value that was determined within a time threshold of the last T days (e.g., T=10 days), wherein the time threshold can be derived from drift data of sensors comparable to the barometric pressure sensor 112;
3. Determining whether there is a calibration value that is of a preferred calibration type in accordance with a priority listing of calibration techniques, such as the following example from highest priority to lowest priority:
   a. Manual User Intervention Request
   b. Building and Terrain
   c. Barometric Pressure Sensor Make & Model
   d. Device Make & Model
   e. Nearby Accurate Sensor
   f. Device ID
   g. Nearby Known Geographic Point
   h. App Context
   i. Machine Learning Model If any of these determinations is positive, then the determination at 304 is "yes" the mobile device's barometric pressure sensor 112 is already sufficiently calibrated, so the process 300 returns to collecting pressure and location data at 302. Otherwise, the determination at 304 is "no" the mobile device's barometric pressure sensor 112 is not sufficiently calibrated, and the process 300 proceeds to 306.

At 306, the mobile device 104 determines whether the collected pressure and location data has been filtered. If so, then the process 300 proceeds to 310. However, if the determination at 306 is that the collected pressure and location data has not been filtered, then the mobile device 104 filters this data at 308 and returns to 306. Such filtering generally discards unreliable data in accordance with a set of filter rules. The following are example filter rules by which unreliable data can be discarded:

1) The activity context is inappropriate (e.g., the data was collected while involved in a driving activity) or too noisy (e.g., the mobile device 104 was changing elevations or the data was collected while the local weather was too severe);
2) The mobile device 104 is not outside, away from a building, in accordance with building data in the terrain and building data 126, if available, or in accordance with GPS I/O information, if available;
3) The mobile device 104 is not on a flat grade, if the terrain quality data 128 is available;
4) A positional anomaly is detected using latitude and longitude staleness, speed of movement or derived speed of the mobile device 104, etc., e.g., the latitude and longitude are fixed to a static value for an extended amount of time (e.g., 1 hour or more), or the latitude and longitude suddenly change in a physically impossible manner within a short time (e.g., changing 100 miles in 5 seconds, or the like);
5) A temperature of a battery of the mobile device 104 is not within a minimum and maximum acceptable threshold range (because the accuracy of some barometric pressure sensors is sensitive to temperature), e.g., the battery temperature reads 45 C, but the threshold range is between 20 C and 40 C; or
6) Any of the measurements read 0 or are invalid (e.g., for the latitude, longitude, or pressure).

If any of the preceding filter rules is true for any of the collected pressure and location data, then that data set is discarded as being unreliable.

Together, the data collection rules and the filter rules ensure that unreliable or untrusted data is not used to calibrate the barometric pressure sensor 112. In some embodiments, the data collection rules and the filter rules can be applied together in one step, either when collecting the data at 302 or when filtering the data at 308.

At 310, the mobile device 104 determines whether it is ready to perform a calibration calculation. In some embodiments, the mobile device 104 is ready whenever it has just one set of the pressure and location data after properly applying the data collection rules and the filter rules. In other embodiments, the mobile device 104 is ready only after collecting and filtering more than one pressure and location data set, because the result of the calibration calculation may be more precise and accurate when more data sets are used and more calibration values are calculated. Then the best, most reliable, or average value of the calibration values can be selected as the final calculation result to be stored in the calibration table. In some embodiments, therefore, the mobile device 104 determines whether it has at least N data packets, each containing a set of the collected pressure and location data. Additionally, N is a threshold that can depend on the age of the previous good calibration, so as to calibrate with less data if the previous good calibration is old, or calibrate with more data if the previous good calibration is not very old. For example, N may be 10 data packets if the good calibration is 5 days old, and N may be 20 data packets if the good calibration is only 3 days old. When the mobile device 104 is not ready to perform a calibration calculation, i.e., the determination at 310 is negative, the process 300 returns to 302 to continue collecting the pressure and location data. On the other hand, when the mobile device 104 is ready to perform a calibration calculation, i.e., the determination at 310 is positive, the process 300 proceeds to 312.

Figure 4:
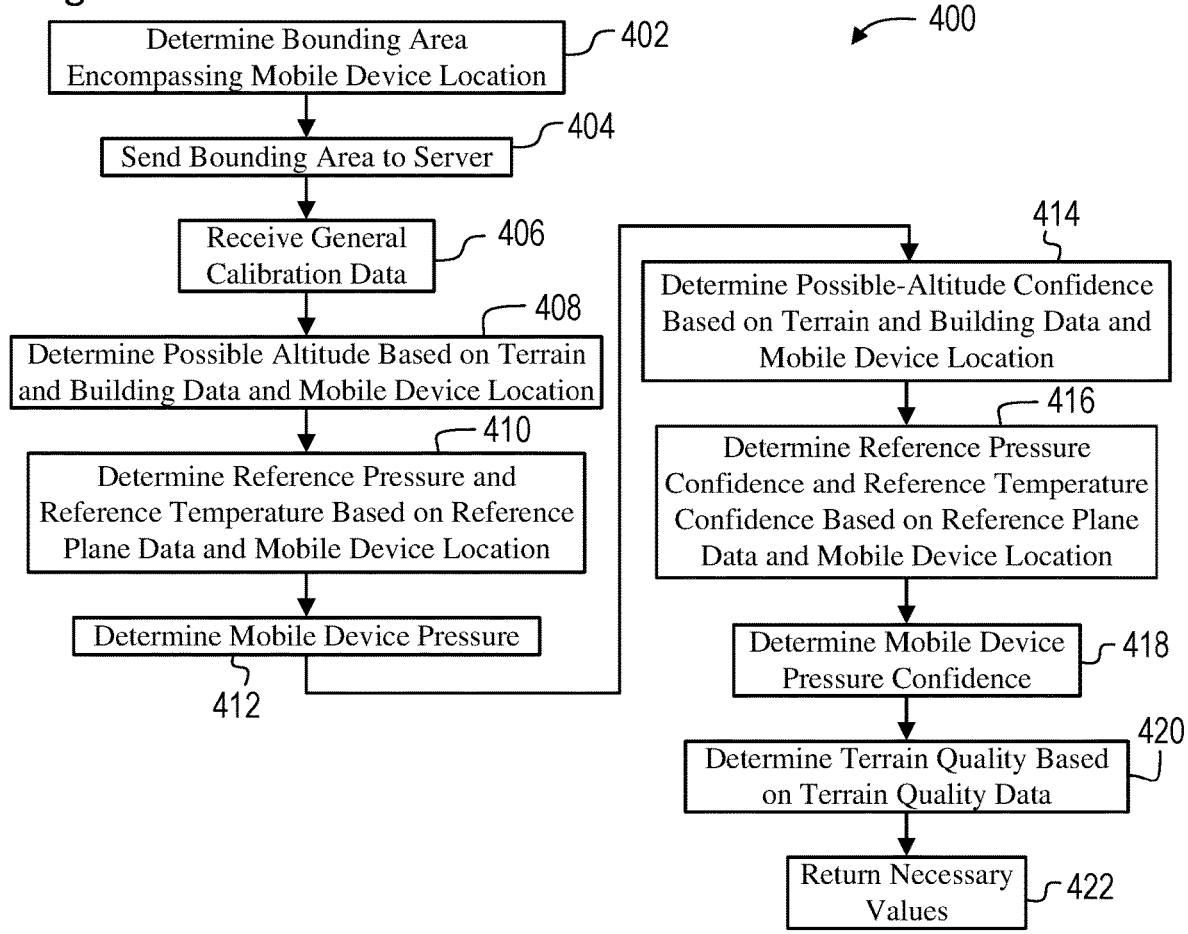
FIG. 4 is a simplified flowchart for an example process for a mobile device to determine necessary parameters for calibrating a barometric pressure sensor in the mobile device, in accordance with some embodiments.
Figure 6:
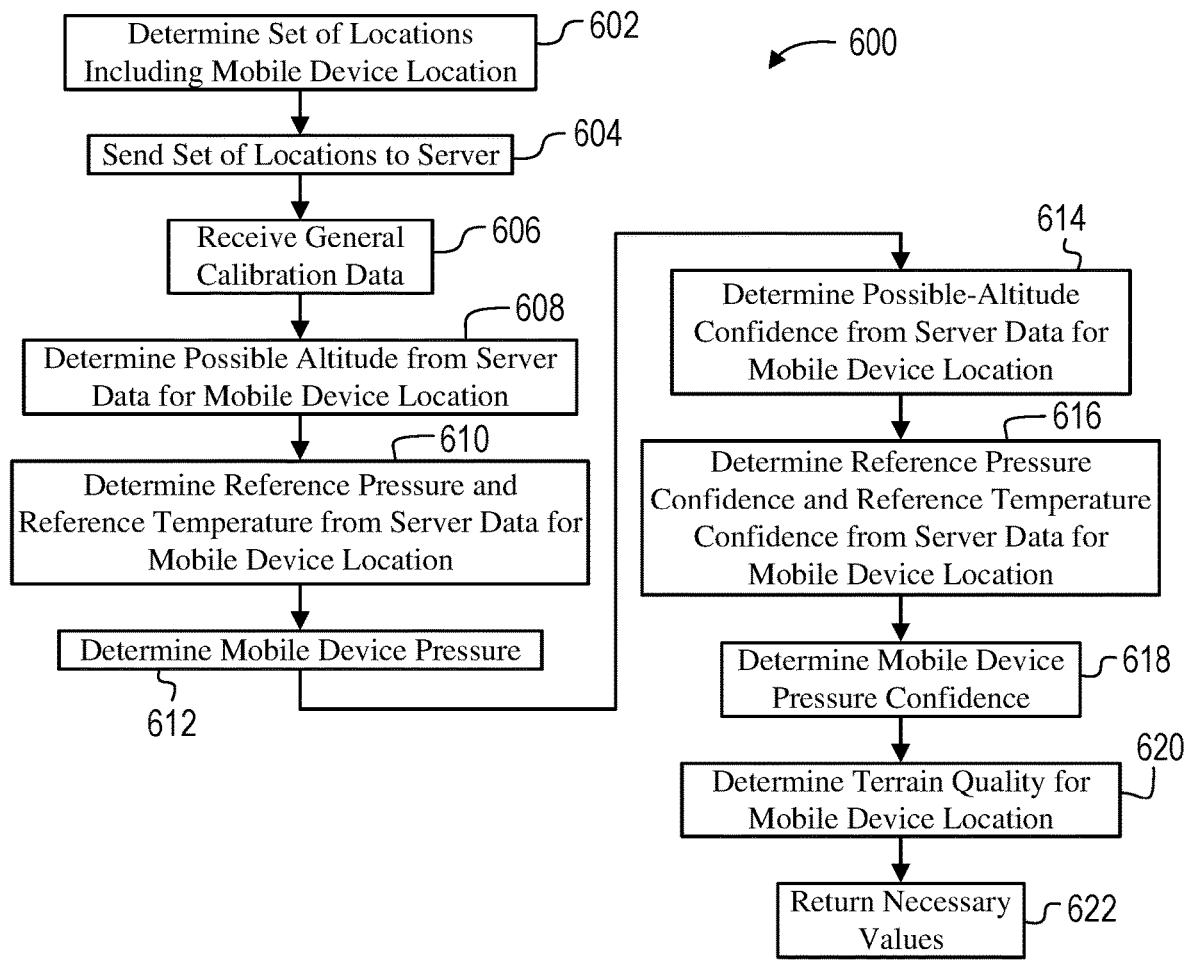
FIG. 6 is a simplified flowchart for another example process for a mobile device to determine necessary parameters for calibrating a barometric pressure sensor in the mobile device, in accordance with some embodiments.
Figure 8:
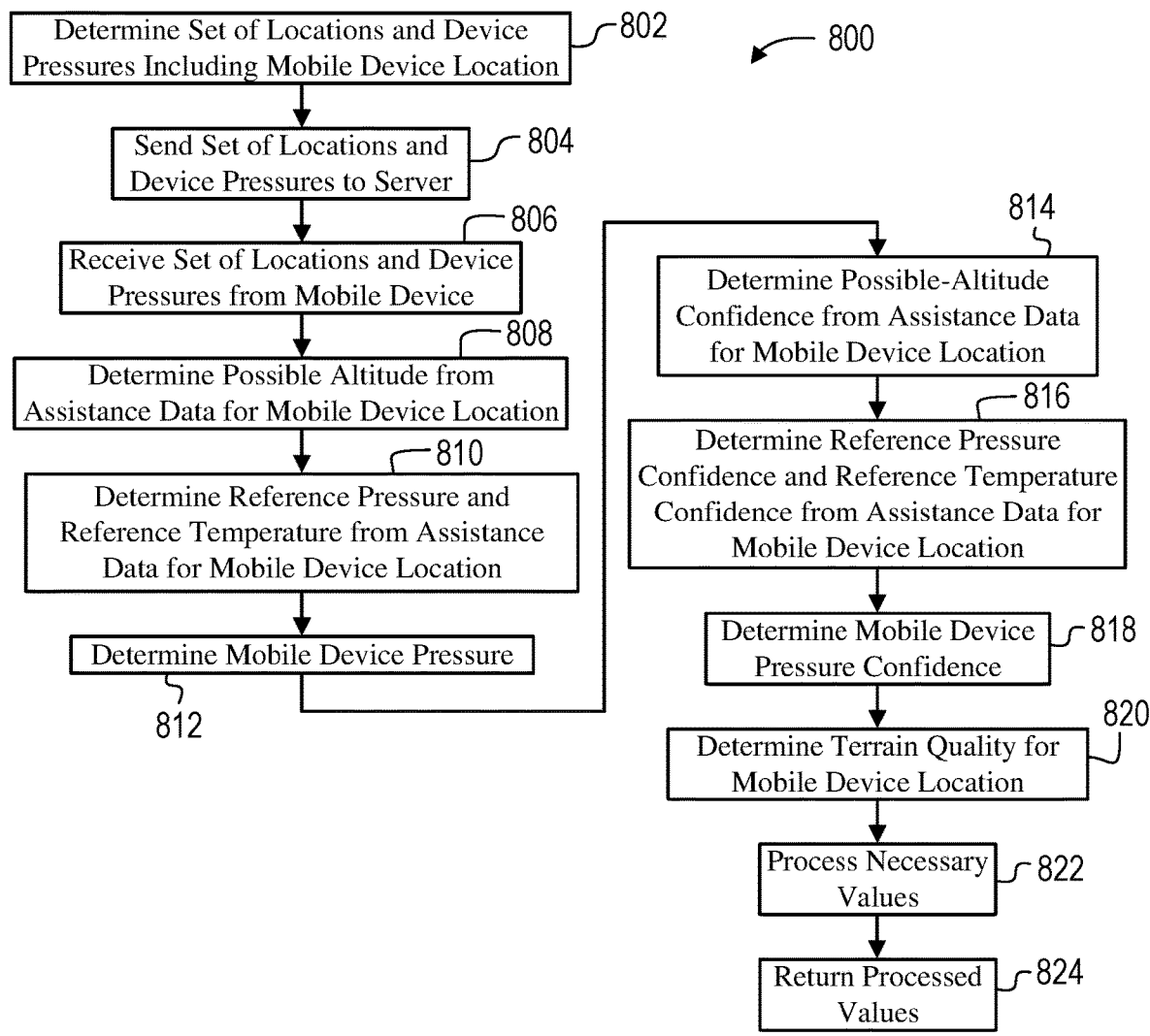
FIG. 8 is a simplified flowchart for another example process for a mobile device to determine necessary parameters for calibrating a barometric pressure sensor in the mobile device, in accordance with some embodiments.

At 312, the mobile device 104 determines the necessary values for calibration, which includes the necessary values for calculating the calibration amount for the calibration value (e.g., the possible altitude of the mobile device 104, the reference pressure, the reference temperature, and the device pressure for the specific location 118) and the necessary values for calculating the calibration confidence interval for the calibration value (e.g., the terrain flatness from the terrain quality data 128 and the confidence or uncertainty values for the possible altitude, the reference pressure, the reference temperature, and the device pressure). An example process 400 is shown in FIG. 4, described below, for the mobile device 104 to determine the necessary values or parameters for calibrating the barometric pressure sensor 112 for embodiments in which the general location 120 includes a bounding area. Additionally, example processes 600 and 800, described below, are shown in FIGS. 6 and 8, respectively, for the mobile device 104 to determine the necessary values or parameters for calibrating the barometric pressure sensor 112 for embodiments in which the general location 120 includes multiple locations.

At 314, the mobile device 104 calculates the calibration value, including the calibration amount and the calibration confidence interval for each set of collected and filtered pressure and location data. In some embodiments, the mobile device 104 begins by calculating the estimated barometric-based altitude of the mobile device 104 ($h_{device}$) using the uncalibrated device pressure from the barometric pressure sensor 112 resulting from the barometric formula:

$$h_{device} = h_{ref} - \frac{RT_{ref}}{gM} \ln\left(\frac{P_{ref}}{P_{device}}\right), \quad \text{Equation 3}$$

where $P_{device}$ is the uncalibrated estimate of pressure at the specific location 118 of the mobile device 104 by the barometric pressure sensor 112 of the mobile device 104, $P_{ref}$ is the reference pressure at the reference plane that is accurate to within a tolerated amount of pressure from true pressure (e.g., less than 5 Pa), $T_{ref}$ is the reference temperature (e.g., in Kelvin) at the reference plane, $h_{ref}$ is the altitude of the reference plane that is estimated to within a desired amount of altitude error (e.g., less than 1.0 meters), g corresponds to the acceleration due to gravity (e.g., −9.8 m/s²), R is a gas constant, and M is molar mass of air (e.g., dry air or other). The minus sign (−) may be substituted with a plus sign (+) in alternative embodiments of Equation 1, as would be understood by one of ordinary skill in the art (e.g., for g=9.8 m/s² or for the natural log operand being $P_{device}/P_{ref}$).

The mobile device 104 obtains the likely or possible altitude $h_{likely}$ of the mobile device 104 from the necessary values determined at 312. Then the mobile device 104 determines the altitude difference dh between the barometric-based altitude $h_{device}$ and the likely or possible altitude $h_{likely}$ (dh=$h_{likely}$−$h_{device}$). The altitude difference dh is converted to a pressure difference dP according to a height-to-pressure scale (h-to-Pa-scale) and the formula dP=dh×h-to-Pa-scale, where h-to-Pa-scale is approximated by RTP/gM (about 12 Pa/m) for typical conditions but can typically range from 8 Pa/m to 15 Pa/m, depending on the environmental conditions. The resulting pressure difference dP is the calibration amount for the calibration value.

Alternatively, the mobile device 104 can use the barometric formula of Equation 3 and adjust the device pressure $P_{device}$ by the pressure difference dP until the barometric-based altitude $h_{device}$ equals the likely or possible altitude $h_{likely}$.

Additionally, the mobile device 104 calculates the calibration confidence interval for the calibration value-beginning with the altitude confidence $h_{conf}$ e.g., according to the formula:

$$h_{conf} = \sqrt{K^2\left[\ln\left(\frac{P_{device}}{P_{ref}}\right)\right]^2 \sigma_T^2 + (KT)^2\left[\left(\frac{\sigma_{P_{ref}}}{P_{ref}}\right)^2 + \left(\frac{\sigma_{P_{device}}}{P_{device}}\right)^2\right]}, \quad \text{Equation 4}$$

where K is R/gM (i.e., approximately 30 m/K), $\sigma_T$ is the uncertainty in the measurement of the reference temperature T, $\sigma_{P_{ref}}$ is the uncertainty in the measurement of the reference pressure $P_{ref}$, $\sigma_{P_{device}}$ is the uncertainty in the measurement of the device pressure $P_{device}$. Here, $P_{ref}$ can be chosen to be the pressure at the weather station, at the terrain of the market, 0 m HAE, 0 m MSL, etc. Therefore, the calibration confidence interval $dP_{conf}$ is $h_{conf}$×h-to-Pa-scale.

At 316, the mobile device 104 stores in the calibration table one or more calibration values obtained at 314, including the calibration amount dP and the calibration confidence interval $dP_{conf}$. The calibration table is a database table that can be stored on the mobile device 104 and contains:

1) The barometric pressure sensor calibration value;
2) The barometric pressure sensor calibration confidence interval;
3) The date of calibration collection (i.e., when the pressure and location data used in the calibration calculation was collected); and
4) Any additional information (e.g., number of fixes that went into the calibration, etc.).

Additionally, a positive or negative sign on the calibration amount dP depends on whether the calibration amount dP is added or subtracted from the measured device pressure to obtain the calibrated device pressure.

Optionally, the calibration table can also include information about the type of calibration technique performed (e.g., user-performed manual calibration, background calibration, factory calibration, batched, single-record (OD) etc.). U.S. patent application Ser. No. 17/303,691, filed on Jun. 4, 2021, and titled "Constraining Barometric Pressure Sensor Calibration with Sporadic Data Collection", discloses additional types of calibration techniques that can be used herein. Thus, U.S. patent application Ser. No. 17/303, 691 is incorporated herein by reference as if fully set forth herein.

At 318, the mobile device 104 compares the calibration values in the calibration table and selects a "best" one. Previously mentioned U.S. patent application Ser. No. 17/303,691 discloses techniques that can be used herein for selecting the best calibration value.

At 320, the mobile device 104 stores the selected best calibration value as the current calibration value 116 in a current calibration table, so the mobile device 104 can use the current calibration value 116 to calibrate the pressure measurements made by the barometric pressure sensor 112.

FIG. 4 shows an example process 400 for the mobile device 104 to determine the necessary values or parameters for calibrating the barometric pressure sensor 112 for embodiments in which the general location 120 includes a bounding area. The particular steps, combination of steps, and order of the steps for this process are provided for illustrative purposes only. Other processes with different steps, combinations of steps, or orders of steps can also be used to achieve the same or similar result. Features or functions described for one of the steps performed by one of the components may be enabled in a different step or component in some embodiments. Additionally, some steps may be performed before, after or overlapping other steps, in spite of the illustrated order of the steps.

At 402, the mobile device 104 determines the precise data packet to be sent to the server 102. The data packet includes the bounding area that encompasses the specific location 118 of the mobile device 104 and the timestamp for the time when the mobile device 104 was at this location. The time and location also apply to when and where the measurement of the device pressure was made by the barometric pressure sensor 112. Thus, the specific location 118, the timestamp, and the device pressure are the set of data that is collected at 302 in the process 300 above. In some embodiments, the mobile device 104 collects multiple sets of this data before it performs the calibration calculations. Each set of the data has a specific location 118, which may be different from or the same as the specific locations 118 in other data sets depending on whether the mobile device 104 has moved (or returned to the same position) between data collections. To accommodate all of the specific locations 118, the mobile device 104 generates one or more of the bounding area, each of which encompasses one or more of the specific location 118, depending on the spatial and/or temporal distribution of the specific locations 118. In other words, the specific locations 118 can be clustered in position and/or time in order to reduce redundant data requests. Therefore, instead of generating a separate bounding area for each specific location 118, the mobile device 104 can combine some of the specific locations 118 that are relatively close together into the same bounding area as may be appropriate (and including the timestamps related to the specific locations 118), thereby saving on transmission bandwidth. Additionally, the size of any given bounding area may also depend on the spatial distribution of the specific locations 118 included therein. Also, the size of the bounding area may depend on a level of a privacy requirement for the mobile device 104, such that a larger bounding area is selected for a higher privacy requirement and a smaller bounding area is selected for a lower privacy requirement. The level of the privacy requirement may be set according to a received user input. Furthermore, the shape of each bounding area may be any appropriate shape, such as circular, elliptical, square, rectangular or any appropriate regular or irregular polygon.

Figure 5:
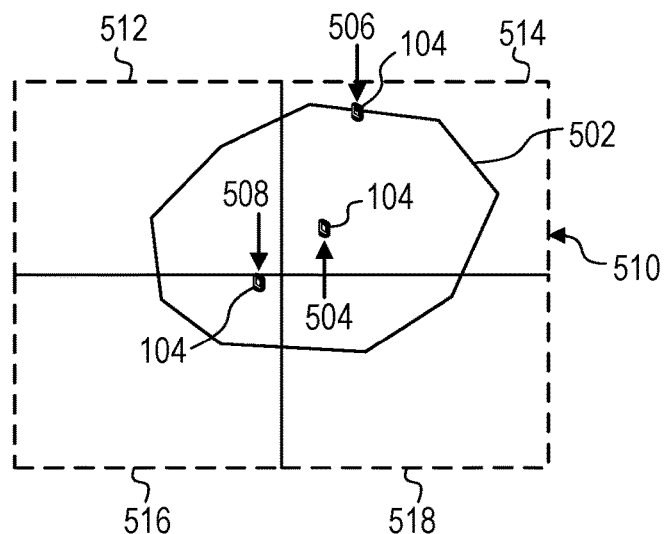
FIG. 5 is a simplified diagram of a region within which a mobile device may be located, in accordance with some embodiments.

An example bounding area 502 is shown in FIG. 5. The bounding area 502 is selected such that the specific location 118 of the mobile device 104 can be at any location therein, such as at/near the center (e.g., at 504), at/near the periphery (e.g., at 506), or at any location in between (e.g., at 508).

At 404, the mobile device 104 sends the one or more bounding areas and timestamps (i.e., the general location 120) as requests to the server 102 in one or more data packets. Each data packet contains one or more bounding areas and the related timestamps. Upon receiving the data packets with the bounding areas and timestamps (i.e., the general location 120), the server 102 assembles one or more of the general calibration data 122 for each combination of bounding area and related timestamp and sends the general calibration data 122 to the mobile device 104, as described above. The general calibration data 122 is for a region and time that encompasses the bounding area and related timestamp. In some embodiments, one region may be used for the portion of the terrain-related data 126 and 128, and a different region may be used for the reference network weather station data sample 132. FIG. 5 shows an example region 510, which may comprise multiple subregions 512-518 that are maintained by the server 102, that encompasses the bounding area 502.

At 406, the mobile device 104 receives the general calibration data 122 including the portion of the terrain-related data 126 and 128 and the reference network weather station data sample 132. For each specific location 118 of the mobile device 104, the mobile device 104 performs 408-420. At 408, the mobile device 104 determines the possible altitude based on the terrain and building data 126 and the specific location 118. At 410, the mobile device 104 determines the reference pressure and reference temperature for the reference plane based on the reference network weather station data sample 132 and the specific location 118. At 412, the mobile device 104 determines the device pressure of the mobile device 104. At this point, the mobile device 104 has assembled the necessary values for calculating the calibration amount for the calibration value (e.g., the possible altitude of the mobile device 104, the reference pressure, the reference temperature, and the device pressure for the specific location 118). At 414, the mobile device 104 determines the altitude confidence for the possible altitude based on the terrain and building data 126 and the specific location 118. At 416, the mobile device 104 determines the reference pressure confidence and reference temperature confidence for the reference plane based on the reference network weather station data sample 132 and the specific location 118. At 418, the mobile device 104 determines the device pressure confidence of the mobile device 104. At 420, the mobile device 104 determines the terrain quality for the specific location 118 based on the terrain quality data 128. At this point, the mobile device 104 has assembled the necessary values for calculating the calibration confidence interval for the calibration value (e.g., the terrain flatness and the confidence or uncertainty values for the possible altitude, the reference pressure, the reference temperature, and the device pressure). At 422, therefore, the mobile device 104 returns the necessary values to the process 300 at 312.

FIG. 6 shows an example process 600 for the mobile device 104 to determine the necessary values or parameters for calibrating the barometric pressure sensor 112 for embodiments in which the general location 120 includes multiple locations. The particular steps, combination of steps, and order of the steps for this process are provided for illustrative purposes only. Other processes with different steps, combinations of steps, or orders of steps can also be used to achieve the same or similar result. Features or functions described for one of the steps performed by one of the components may be enabled in a different step or component in some embodiments. Additionally, some steps may be performed before, after or overlapping other steps, in spite of the illustrated order of the steps.

At 602, the mobile device 104 determines the precise data packet to be sent to the server 102. The data packet includes multiple locations, which include one or more of the specific location 118 of the mobile device 104 and a timestamp(s) for the time(s) when the mobile device 104 was at this location (s). The multiple locations include more locations than the specific location(s) 118, so the remainder of the locations includes additional dummy locations generated by the mobile device 104 in approximately the same general region as that of the specific location(s) 118. The data packet also includes dummy timestamps (for the dummy locations) generated by the mobile device 104 in approximately the same timeframe as that of the timestamp(s) for the specific location(s) 118. The data packet further includes the device pressure(s) measured by the barometric pressure sensor 112 at the specific location(s) 118 and dummy device pressures generated by the mobile device 104 for the dummy locations. The dummy device pressures can be randomly generated to be appropriate for the dummy locations or within a general range that includes the device pressure(s), or the dummy device pressures can simply be copied from the device pressure(s). The time and location also apply to when and where the measurement of the device pressure was made by the barometric pressure sensor 112. Thus, the specific location 118, the timestamp, and the device pressure are the set of data that is collected at 302 in the process 300 above. In some embodiments, the mobile device 104 collects multiple sets of this data before it performs the calibration calculations. Each set of the data has a specific location 118, which may be different from or the same as the specific locations 118 in other data sets depending on whether the mobile device 104 has moved (or returned to the same position) between data collections. To accommodate all of the specific locations 118, the mobile device 104 can generate the multiple locations to include one or more of the specific location 118 along with additional dummy locations. In other words, instead of generating a separate set of multiple locations for each specific location 118, the mobile device 104 can include the specific locations 118 in the same set of multiple locations as may be appropriate (and including the timestamps related to the specific locations 118), thereby saving on transmission bandwidth. Additionally, the number of the additional dummy locations may depend on a number that is considered necessary to adequately obscure the specific locations 118 or on a level of a privacy requirement for the mobile device 104, such that a larger number is selected for a higher privacy requirement and a smaller number is selected for a lower privacy requirement (e.g., the number of dummy locations may be 10-100 times the number of specific locations 118). Furthermore, the distribution and location of the additional dummy locations should be in the same general region as that of the specific locations 118. Additionally, if some of the specific locations 118 are widely separated from the other specific locations 118, then it may be preferable to generate more than one set of the multiple locations, each containing a portion of the specific locations 118.

Figure 7:
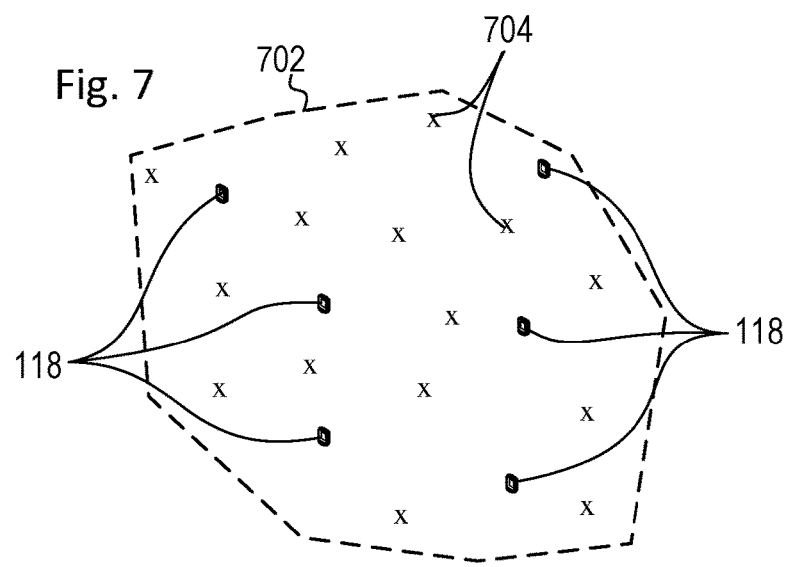
FIG. 7 is a simplified diagram of another region within which a mobile device may be located, in accordance with some embodiments.

An example set of multiple locations within a region 702 is shown in FIG. 7. The multiple locations include the specific locations 118 and a randomly generated set of the additional dummy locations 704 denoted by an "x". A size of the region 702, or spatial distribution of the specific locations 118 and the additional dummy locations 704, depends on a level of a privacy requirement for the mobile device 104, such that a larger region is selected for a higher privacy requirement and a smaller region is selected for a lower privacy requirement.

At 604, the mobile device 104 sends the multiple locations and timestamps (i.e., the general location 120) as multiple requests to the server 102 in one or more data packets. Each data packet contains one or more of the locations of the multiple locations and the related timestamps. Upon receiving the data packets with each location and timestamp (i.e., the general location 120), the server 102 assembles the general calibration data 122, which includes the likely or possible altitude (and confidence therefor) for each location, the reference pressure and reference temperature (and confidence therefor) for each location, and the terrain quality data 128 for each location. The server 102 sends the general calibration data 122 to the mobile device 104 in one or more packets, as described above.

At 606, the mobile device 104 receives the general calibration data 122 including the above described data for each specific location 118 and each additional dummy location 704. The mobile device 104 deletes the data for each additional dummy location 704. For each specific location 118 of the mobile device 104, the mobile device 104 performs 608-620.

At 608, the mobile device 104 determines the possible altitude based on the data received from the server 102 for the specific location 118. At 610, the mobile device 104 determines the reference pressure and reference temperature for the reference plane based on the data received from the server 102 for the specific location 118. At 612, the mobile device 104 determines the device pressure of the mobile device 104 for the specific location 118. At this point, the mobile device 104 has assembled the necessary values for calculating the calibration amount for the calibration value (e.g., the possible altitude of the mobile device 104, the reference pressure, the reference temperature, and the device pressure for the specific location 118). At 614, the mobile device 104 determines the altitude confidence for the possible altitude based on the data received from the server 102 for the specific location 118. At 616, the mobile device 104 determines the reference pressure confidence and reference temperature confidence for the reference plane based on the data received from the server 102 for the specific location 118. At 618, the mobile device 104 determines the device pressure confidence of the mobile device 104 for the specific location 118. At 620, the mobile device 104 determines the terrain quality for the specific location 118 based on the terrain quality data 128. At this point, the mobile device 104 has assembled the necessary values for calculating the calibration confidence interval for the calibration value (e.g., the terrain flatness and the confidence or uncertainty values for the possible altitude, the reference pressure, the reference temperature, and the device pressure). At 622, therefore, the mobile device 104 returns the necessary values to the process 300 at 312.

FIG. 8 shows another example process 800 for the mobile device 104 to determine the necessary values or parameters for calibrating the barometric pressure sensor 112 for embodiments in which the general location 120 includes multiple locations. In this process 800, the server 102 performs some of the functions, but the mobile device 104 still performs the final functions in process 300 above. The particular steps, combination of steps, and order of the steps for this process are provided for illustrative purposes only. Other processes with different steps, combinations of steps, or orders of steps can also be used to achieve the same or similar result. Features or functions described for one of the steps performed by one of the components may be enabled in a different step or component in some embodiments. Additionally, some steps may be performed before, after or overlapping other steps, in spite of the illustrated order of the steps.

At 802, the mobile device 104 determines the precise data packet to be sent to the server 102. The data packet includes multiple locations, which include one or more of the specific location 118 of the mobile device 104 and a timestamp(s) for the time(s) when the mobile device 104 was at this location(s). The multiple locations include more locations than the specific location(s) 118, so the remainder of the locations includes additional dummy locations generated by the mobile device 104 in approximately the same general region as that of the specific location(s) 118. The data packet also includes dummy timestamps (for the dummy locations) generated by the mobile device 104 in approximately the same timeframe as that of the timestamp(s) for the specific location(s) 118. The data packet further includes the device pressure(s) measured by the barometric pressure sensor 112 at the specific location(s) 118 and dummy device pressures generated by the mobile device 104 for the dummy locations. The dummy device pressures can be randomly generated to be appropriate for the dummy locations or within a general range that includes the device pressure(s), or the dummy device pressures can simply be copied from the device pressure(s). The time and location also apply to when and where the measurement of the device pressure was made by the barometric pressure sensor 112. In some embodiments, the mobile device 104 collects multiple sets of this data before it performs the calibration calculations. Each set of the data has a specific location 118, which may be different from or the same as the specific locations 118 in other data sets depending on whether the mobile device 104 has moved (or returned to the same position) between data collections. To accommodate all of the specific locations 118, the mobile device 104 can generate the multiple locations to include one or more of the specific location 118 along with the additional dummy locations. In other words, instead of generating a separate set of multiple locations for each specific location 118, the mobile device 104 can include the specific locations 118 in the same set of multiple locations as may be appropriate (and including the timestamps related to the specific locations 118), thereby saving on transmission bandwidth. Additionally, the number of the additional dummy locations may depend on a number that is considered necessary to adequately obscure the specific locations 118 or on a level of a privacy requirement for the mobile device 104, such that a larger number is selected for a higher privacy requirement and a smaller number is selected for a lower privacy requirement (e.g., the number of dummy locations may be 10-100 times the number of specific locations 118). Furthermore, the distribution and location of the additional dummy locations should be in the same general region as that of the specific locations 118. Additionally, if some of the specific locations 118 are widely separated from the other specific locations 118, then it may be preferable to generate more than one set of the multiple locations, each containing a portion of the specific locations 118.

The example set of multiple locations within the region 702 shown in FIG. 7 and described above with respect to the process 600 is also applicable to the process 800.

At 804, the mobile device 104 sends the multiple locations and related device pressures and timestamps (i.e., the general location 120) as multiple requests to the server 102 in one or more data packets. Each data packet contains one or more sets of the location, pressure and timestamp data for the multiple locations. Upon receiving (at 806) the data packets with each set of data (i.e., the general location 120), the server 102 does not assemble the general calibration data 122 for sending to the mobile device 104, as described above. Instead, the server 102 proceeds to determine the necessary values for each location, which includes the likely or possible altitude (and confidence therefor) for each location, the reference pressure and reference temperature (and confidence therefor) for each location, and the terrain quality data 128 for each location. Thus, for each location of the multiple locations received from the mobile device 104, the server 102 performs 808-820 to process the location, pressure and timestamp data.

At 808, the server 102 determines the possible altitude based on the assistance data maintained by the server 102 and each location received from the mobile device 104. At 810, the server 102 determines the reference pressure and reference temperature based on the assistance data for each location. At 812, the server 102 determines the device pressure of the mobile device 104 for each location. At this point, the server 102 has assembled the necessary values for calculating the calibration amount for the calibration value (e.g., the possible altitude of the mobile device 104, the reference pressure, the reference temperature, and the device pressure for each location). At 814, the server 102 determines the altitude confidence for the possible altitude based on the assistance data for each location. At 816, the server 102 determines the reference pressure confidence and reference temperature confidence based on the assistance data for each location. At 818, the server 102 determines the device pressure confidence of the mobile device 104 for each location. At 820, the server 102 determines the terrain quality for each location based on the terrain quality data 128. At this point, the server 102 has assembled the necessary values for calculating the calibration confidence interval for the calibration value (e.g., the terrain flatness and the confidence or uncertainty values for the possible altitude, the reference pressure, the reference temperature, and the device pressure). At 822, the server 102 processes the necessary values and returns (at 824) the processed values to the mobile device 104 for use by the process 300 at 312. The processed values include data from which the mobile device 104 can directly calculate the calibration value, e.g., the processed values may include the device altitude calculated by the barometric formula and/or the possible altitude, or the difference between the calculated device altitude and the possible altitude (described above). In this embodiment, therefore, the processed values are considered to be the general calibration data 122 sent by the server 102 and received by the mobile device 104. The mobile device 104, thus, uses the processed values at 314 for the specific locations 118 (which corresponds to the specific calibration data 124) to determine the calibration values. This embodiment has the benefit of keeping the assistance data on the server 102 and reducing the computation load on the mobile device 104, while still protecting user privacy.

Any method, technique, process, approach or computation described or otherwise enabled by disclosure herein may be implemented by hardware components (e.g., machines), software modules (e.g., stored in machine-readable media), or a combination thereof. In particular, any method or technique described or otherwise enabled by disclosure herein may be implemented by any concrete and tangible system described herein. By way of example, machines may include one or more computing device(s), processor(s), controller(s), integrated circuit(s), chip(s), system(s) on a chip, server(s), programmable logic device(s), field programmable gate array(s), electronic device(s), special purpose circuitry, and/or other suitable device(s) described herein or otherwise known in the art. One or more non-transitory machine-readable media embodying program instructions that, when executed by one or more machines, cause the one or more machines to perform or implement operations comprising the steps of any of the methods described herein are contemplated herein. As used herein, machine-readable media includes all forms of machine-readable media, including but not limited to one or more non-volatile or volatile storage media, removable or non-removable media, integrated circuit media, magnetic storage media, optical storage media, or any other storage media, including RAM, ROM, and EEPROM, that may be patented under the laws of the jurisdiction in which this application is filed, but does not include machine-readable media that cannot be patented under the laws of the jurisdiction in which this application is filed (e.g., transitory propagating signals). Methods disclosed herein provide sets of rules that are performed. Systems that include one or more machines and one or more non-transitory machine-readable media for implementing any method described herein are also contemplated herein. One or more machines that perform or implement, or are configured, operable or adapted to perform or implement operations comprising the steps of any methods described herein are also contemplated herein. Each method described herein that is not prior art represents a specific set of rules in a process flow that provides significant advantages in the fields of calibration and position location. Method steps described herein may be order independent and can be performed in parallel or in an order different from that described if possible to do so. Different method steps described herein can be combined to form any number of methods, as would be understood by one of ordinary skill in the art. Any method step or feature disclosed herein may be omitted from a claim for any reason. Certain well-known structures and devices are not shown in figures to avoid obscuring the concepts of the present disclosure. When two things are "coupled to" each other, those two things may be directly connected together, or separated by one or more intervening things. Where no lines or intervening things connect two particular things, coupling of those things is contemplated in at least one embodiment unless otherwise stated. Where an output of one thing and an input of another thing are coupled to each other, information sent from the output is received in its outputted form or a modified version thereof by the input even if the information passes through one or more intermediate things. Any known communication pathways and protocols may be used to transmit information (e.g., data, commands, signals, bits, symbols, chips, and the like) disclosed herein unless otherwise stated. The words comprise, comprising, include, including and the like are to be construed in an inclusive sense (i.e., not limited to) as opposed to an exclusive sense (i.e., consisting only of). Words using the singular or plural number also include the plural or singular number, respectively, unless otherwise stated. The word "or" and the word "and" as used in the Detailed Description cover any of the items and all of the items in a list unless otherwise stated. The words some, any and at least one refer to one or more. The terms may or can are used herein to indicate an example, not a requirement—e.g., a thing that may or can perform an operation, or may or can have a characteristic, need not perform that operation or have that characteristic in each embodiment, but that thing performs that operation or has that characteristic in at least one embodiment. Unless an alternative approach is described, access to data from a source of data may be achieved using known techniques (e.g., requesting component requests the data from the source via a query or other known approach, the source searches for and locates the data, and the source collects and transmits the data to the requesting component, or other known techniques).

An environment in which processes described herein may operate may include a network of weather stations or terrestrial transmitters, at least one mobile device (e.g., user device), and a server. Each of the weather stations and the mobile device may be located at different altitudes or depths that are inside or outside various natural or manmade structures (e.g., buildings). Location or positioning signals may be respectively transmitted from the weather stations/transmitters and satellites, and subsequently received by the mobile device using known transmission technologies. For example, the weather stations may transmit the signals using one or more common multiplexing parameters that utilize time slots, pseudorandom sequences, frequency offsets, or other approaches, as is known in the art or otherwise disclosed herein. The mobile device may take different forms, including a mobile phone or other wireless communication device, a portable computer, a navigation device, a tracking device, a receiver, or another suitable device that can receive the signals. Each weather station and mobile device may include atmospheric sensors (e.g., a pressure and temperature sensors) for generating measurements of atmospheric conditions (e.g., pressure and temperature) that are used to estimate an unknown altitude of the mobile device. By way of example, a pressure sensor of the mobile device may also be calibrated from time to time.

By way of example in FIG. 9, weather stations 202 discussed herein may include: a mobile device interface 11 for exchanging information with a mobile device 104 (e.g., antenna(s) and RF front end components known in the art or otherwise disclosed herein); one or more processor(s) 12; memory/data source 13 for providing storage and retrieval of information and/or program instructions; atmospheric sensor(s) 14 for measuring environmental conditions (e.g., pressure, temperature, humidity, other) at or near the weather station 202; a server interface 15 for exchanging information with a server 102 (e.g., an antenna, a network interface, or other); and any other components known to one of ordinary skill in the art. The memory/data source 13 may include memory storing software modules with executable instructions, and the processor(s) 12 may perform different actions by executing the instructions from the modules, including: (i) performance of part or all of the methods as described herein or otherwise understood by one of skill in the art as being performable at the weather station 202; (ii) generation of positioning signals for transmission using a selected time, frequency, code, and/or phase; (iii) processing of signaling received from the mobile device 104 or other source; or (iv) other processing as required by operations described in this disclosure. Signals generated and transmitted by the weather station 202 may carry different information that, once determined by the mobile device 104 or the server 102, may identify the following: the weather station 202; the weather station's position; environmental conditions at or near the weather station 202; and/or other information known in the art. The atmospheric sensor(s) 14 may be integral with the weather station 202, or separate from the weather station 202 and either co-located with the weather station 202 or located in the vicinity of the weather station 202 (e.g., within a threshold amount of distance).

By way of example in FIG. 9, the mobile device 104 may include a network interface 27 for exchanging information with the server 102 via the network 106 (e.g., a wired and/or a wireless interface port, an antenna and RF front end components known in the art or otherwise disclosed herein); a weather station interface 21 for exchanging information with the weather stations 202; one or more processor(s) 22; memory/data source 23 for providing storage and retrieval of information and/or program instructions; atmospheric sensor(s) 24 (including the barometric pressure sensor 112) for measuring environmental conditions (e.g., pressure, temperature, other) at the mobile device 104; other sensor(s) 25 for measuring other conditions (e.g., compass, accelerometer and inertial sensors for measuring movement and orientation); a user interface 26 (e.g., display, keyboard, microphone, speaker, other) for permitting the user of the mobile device 104 to provide inputs and receive outputs; and any other components known to one of ordinary skill in the art. A GNSS interface and processing unit (not shown) are contemplated, which may be integrated with other components or a standalone antenna, RF front end, and processors dedicated to receiving and processing GNSS signaling. The memory/data source 23 may include memory storing data and software modules with executable instructions, including a signal processing module, a signal-based position estimate module, a pressure-based altitude module, a movement determination module, the current calibration value, the data packet, a calibration module, and other modules. The processor(s) 22 may perform different actions by executing the instructions from the modules, including: (i) performance of part or all of the methods, processes and techniques as described herein or otherwise understood by one of ordinary skill in the art as being performable at the mobile device 104; (ii) estimation of an altitude of the mobile device 104 (based on measurements of pressure from the mobile device 104 and weather station(s) 202, temperature measurement(s) from the weather station(s) 202 or another source, and any other information needed for the computation); (iii) processing of received signals to determine position information or location data (e.g., times of arrival or travel time of the signals, pseudoranges between the mobile device 104 and weather stations 202, weather station atmospheric conditions, weather station and/or locations or other weather station information); (iv) use of position information to compute an estimated position of the mobile device 104; (v) determination of movement based on measurements from inertial sensors of the mobile device 104; (vi) GNSS signal processing; (vii) assembling and transmitting the general location 120; (viii) storing the current calibration value 116, the specific location 118, the general location 120, the general calibration data 122, and the specific calibration data 124; (ix) calibrating the barometric pressure sensor 112 based on the specific calibration data 124; (x) generating the specific calibration data 124 from the received general calibration data 122; and/or (xi) other processing as required by operations described in this disclosure.

By way of example in FIG. 9, the server 102 may include: a network interface 31 for exchanging information with the mobile device 104 and other sources of data via the network 106 (e.g., a wired and/or a wireless interface port, an antenna, or other); one or more processor(s) 32; memory/data source 33 for providing storage and retrieval of information and/or program instructions; and any other components known to one of ordinary skill in the art. The memory/data source 33 may include memory storing software modules with executable instructions, such as a general calibration data assembly module, calibration technique modules, a signal-based positioning module, a pressure-based altitude module, a calibration conduciveness module, as well as other modules for each of the above-described methods and processes or portions/steps thereof. The processor(s) 32 may perform different actions by executing instructions from the modules, including: (i) performance of part or all of the methods, processes and techniques as described herein or otherwise understood by one of ordinary skill in the art as being performable at the server 102; (ii) estimation of an altitude of the mobile device 104; (iii) computation of an estimated position of the mobile device 104; (iv) performance of calibration techniques; (v) calibration of the mobile device 104; (vi) determination of calibration conduciveness for a calibration opportunity; (vii) assembly and transmission of general calibration data; or (viii) other processing as required by operations or processes described in this disclosure. Steps performed by servers 102 as described herein may also be performed on other machines that are remote from the mobile device 104, including computers of enterprises or any other suitable machine.

Reference has been made in detail to embodiments of the disclosed invention, one or more examples of which have been illustrated in the accompanying figures. Each example has been provided by way of explanation of the present technology, not as a limitation of the present technology. In fact, while the specification has been described in detail with respect to specific embodiments of the invention, it will be appreciated that those skilled in the art, upon attaining an understanding of the foregoing, may readily conceive of alterations to, variations of, and equivalents to these embodiments. For instance, features illustrated or described as part of one embodiment may be used with another embodiment to yield a still further embodiment. Thus, it is intended that the present subject matter covers all such modifications and variations within the scope of the appended claims and their equivalents. These and other modifications and variations to the present invention may be practiced by those of ordinary skill in the art, without departing from the scope of the present invention, which is more particularly set forth in the appended claims. Furthermore, those of ordinary skill in the art will appreciate that the foregoing description is by way of example only, and is not intended to limit the invention.

What is claimed is:

1. A method comprising:
   determining, by a mobile device, a specific location and a specific location area of the mobile device, wherein the specific location is based on position data from a position sensor of the mobile device and the specific location area is based on a confidence interval value associated with the position data;
   determining, by the mobile device, a general location of the mobile device that encompasses and obfuscates the specific location, wherein the specific location is obfuscated by the general location not revealing the specific location, and the general location comprises a bounding area that encompasses and is larger than the specific location area;
   transmitting, by the mobile device, the general location to a server;
   receiving, by the mobile device from the server, general calibration data for the general location;
   determining, by the mobile device, specific calibration data based on the general calibration data and the specific location;
   determining, by the mobile device, a device pressure based on a pressure measurement by a barometric pressure sensor of the mobile device;
   determining, by the mobile device, a calibration value based on the specific calibration data and the device pressure, the calibration value being for calibrating the barometric pressure sensor; and
   calculating, by the mobile device, an altitude of the mobile device using the calibration value and a subsequent pressure measurement by the barometric pressure sensor.

2. The method of claim 1, wherein:
   the specific location is at any point within the bounding area.

3. The method of claim 1, wherein receiving the general calibration data further comprises:
   receiving terrain and building data with respect to the bounding area; and
   receiving reference pressure data and reference temperature data for a region that encompasses the bounding area, the reference pressure data and the reference temperature data being based on pressure measurements and temperature measurements generated by reference weather stations.

4. The method of claim 3, wherein determining the specific calibration data further comprises:
   determining specific terrain and building data for the specific location from the terrain and building data;
   determining a possible altitude for the mobile device based on the specific terrain and building data; and
   determining a specific reference pressure and a specific reference temperature for the specific location from the reference pressure data and the reference temperature data for the region that encompasses the bounding area.

5. The method of claim 3, wherein:
the terrain and building data comprises a portion of a terrain and building database.

6. The method of claim 3, wherein:
the terrain and building data comprises a terrain and building distribution for a latitude and longitude confidence surrounding the bounding area.

7. The method of claim 3, wherein:
the terrain and building data comprises a polynomial model that has been fit to data of a terrain and building database.

8. The method of claim 3, wherein:
the reference pressure data and reference temperature data comprises data of a reference pressure and temperature database.

9. The method of claim 3, wherein:
the reference pressure data and reference temperature data comprises a polynomial model that has been fit to data of a reference pressure and temperature database.

10. The method of claim 3, further comprising:
storing, by the mobile device, the terrain and building data, the reference pressure data, and the reference temperature data; and
upon determining that the mobile device is not within the bounding area, deleting, by the mobile device, the terrain and building data, the reference pressure data, and the reference temperature data.

11. The method of claim 3, wherein:
the terrain and building data includes terrain quality data with respect to the bounding area.

12. The method of claim 1, wherein:
a size of the bounding area depends on a level of a privacy requirement for the mobile device, such that a larger bounding area is selected for a higher privacy requirement and a smaller bounding area is selected for a lower privacy requirement.

13. A method comprising:
determining, by a mobile device, a specific location of the mobile device, wherein the specific location is based on position data from a position sensor of the mobile device;
determining, by the mobile device, a general location of the mobile device that encompasses and obfuscates the specific location;
transmitting, by the mobile device, the general location to a server;
receiving, by the mobile device from the server, general calibration data for the general location;
determining, by the mobile device, specific calibration data based on the general calibration data and the specific location;
determining, by the mobile device, a device pressure based on a pressure measurement by a barometric pressure sensor of the mobile device;
determining, by the mobile device, a calibration value based on the specific calibration data and the device pressure, the calibration value being for calibrating the barometric pressure sensor; and
calculating, by the mobile device, an altitude of the mobile device using the calibration value and a subsequent pressure measurement by the barometric pressure sensor;
wherein:
the general location comprises a plurality of locations which includes the specific location and a remainder of locations;
the plurality of locations is within a region;
the specific location is at any point within the region; and
the general location obfuscates the specific location by the specific location being at any point within the region.

14. The method of claim 13, wherein receiving the general calibration data further comprises:
receiving a possible altitude for each location of the plurality of locations; and
receiving a reference pressure and a reference temperature for each location of the plurality of locations.

15. The method of claim 14, wherein determining the specific calibration data further comprises:
determining a specific possible altitude for the mobile device by selecting the received possible altitude for the specific location; and
determining a specific reference pressure and a specific reference temperature for the specific location by selecting the received reference pressure and the received reference temperature for the specific location.

16. The method of claim 14, wherein receiving the general calibration data further comprises:
receiving terrain quality data for each location of the plurality of locations.

17. The method of claim 13, wherein:
the plurality of locations is selected to be arranged in a grid pattern within the region.

18. The method of claim 13, wherein:
the plurality of locations is selected to be at random latitude and longitude points within the region.

19. The method of claim 13, wherein:
a size of the region depends on a level of a privacy requirement for the mobile device, such that a larger region is selected for a higher privacy requirement and a smaller region is selected for a lower privacy requirement.

20. The method of claim 13, wherein:
a number of the remainder of locations depends on a level of a privacy requirement for the mobile device, such that a larger number is selected for a higher privacy requirement and a smaller number is selected for a lower privacy requirement.

* * * * *